(12) United States Patent
Gui et al.

(10) Patent No.: US 9,219,549 B2
(45) Date of Patent: Dec. 22, 2015

(54) WDM MUX/DEMUX EMPLOYING FILTERS SHAPED FOR MAXIMUM USE THEREOF

(71) Applicant: Alliance Fiber Optic Products, Inc., Sunnyvale, CA (US)

(72) Inventors: Dong Gui Gui, Sunnyvale, CA (US); Yao Li, Newark, CA (US); Qijun Xiao, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 14/451,183

(22) Filed: Aug. 4, 2014

(65) Prior Publication Data

US 2015/0125163 A1 May 7, 2015

Related U.S. Application Data

(60) Provisional application No. 61/962,130, filed on Nov. 1, 2013.

(51) Int. Cl.
*H04B 10/00* (2013.01)
*H04B 10/572* (2013.01)
*H04J 14/02* (2006.01)
*H04J 14/00* (2006.01)

(52) U.S. Cl.
CPC .............. *H04B 10/572* (2013.01); *H04J 14/02* (2013.01)

(58) Field of Classification Search
CPC ................................ H04B 10/572; H04J 14/02
See application file for complete search history.

(56) References Cited

U.S. PATENT DOCUMENTS

2013/0148970 A1* 6/2013 Nakajima et al. ............... 398/79

\* cited by examiner

*Primary Examiner* — Daniel Dobson
(74) *Attorney, Agent, or Firm* — Joe Zheng

(57) ABSTRACT

Filters shaped differently from those commonly used in WDM Mux/DeMux optical devices are described. Different from the prior art devices that commonly use filters shaped in cuboid, the filters in the embodiment of the present invention are shaped in parallelepiped. In other words, a cross section of such filter is not in parallelogram. According to one embodiment of the present invention, a filter is so cut that a cross section thereof presents a cutting angle not being 90 degrees. As a result, the filter is fully used in WDM Mux/DeMux optical devices. Such filters are advantageously used in compact optical modules.

3 Claims, 5 Drawing Sheets

Table 1. Summary of WDM subassembly design

| Case # | n0 | n | pitch (μm) 2d*tanα | d (μm) d | α (deg) α | Θ (deg) Sin⁻¹(n0*Sinα/n) |
|---|---|---|---|---|---|---|
| 1 | n0 | n | 2d*tanα | d | α | Sin⁻¹(n0*Sinα/n) |
| 2 | 1 | 1.523 | 500 | 1041 | 13.5 | 8.8 |
| 3 | 1 | 1.523 | 500 | 1176 | 12 | 7.8 |
| 4 | 1 | 1.523 | 350 | 729 | 13.5 | 8.8 |
| 5 | 1.7 | 1 | 500 | 1041 | 13.5 | 7.9 |
| 6 | 1.1 | 1.523 | 500 | 1041 | 13.5 | 9.7 |
| 7 | 1.523 | 1.523 | 500 | 1041 | 13.5 | 13.5 |

*FIG. 7*

WDM MUX/DEMUX EMPLOYING FILTERS SHAPED FOR MAXIMUM USE THEREOF

CROSS-REFERENCE TO RELATED APPLICATION

This application claims the benefits of U.S. Provisional Application No. 61/962,130, filed Nov. 1, 2013, and entitled "Non Perpendicular Side-wall Filter Arrays For Densely Packaged Free-space WDM Assemblies", which is hereby incorporated by reference for all purposes.

BACKGROUND OF THE INVENTION

1. Field of the Invention

The invention is generally related to the area of optical communications. In particular, the invention is related to WDM Mux/DeMux on cable and methods of making the same.

2. The Background of Related Art

Broadband internet has experienced a compounded annual bandwidth growth rate exceeding 30% over the last decade. The momentum shows no sign of slowing down as wireless broadband, due to the smart phones and portable devices, joins the game. Fibers that facilitate much of such land-line bandwidth supports in the past now challenge device and equipment development to keep up the speed to fill their available bandwidth capacities. In core networks, transport equipment can now support 40 Gbps and 100 Gbps per wavelength using dense wavelength division multiplexing (DWDM) carriers. 400 Gbps and even 1 Tbps per wavelength channel are being discussed and laboratory tried.

In order to meet the requirement of fast speed optical communication, multi-channels of difference wavelength is widely applied. Multiplexers/De-multiplexers (Mux/De-Mux) is one of the components that are often needed in optical modules, such as C form-factor pluggable (CFP) as a key component to combine/split 4 signals, each operating at a different wavelength, into/from a common optical fiber. FIG. 1 a typical four channels of de-multiplexers (Demux) for CFP application. In the device, a light beam at multiple wavelengths traveling from a common port is separated into individual beams, respectively directed to individual channels. At each of the multiple channel, a dielectric thin film filter (TFF) transmits a selected wavelength band of the multiple-wavelength collimated light passed by a corresponding channel port from $\lambda_1$ to $\lambda_n$ and reflect all other wavelengths.

FIG. 2 shows a typical optical transmission and reflection spectra of a single-channel band-pass filter that transmits a wavelength $\lambda$ and reflects wavelength from $\lambda_1$ to $\lambda_{i-1}$ and $\lambda_{i+1}$ to $\lambda_n$. The reflected wavelength signals continue propagating to next channel ports, where the in-band signal is transmitted through the filter and the other signals are reflected and propagate along the path controlled by the reflectors and the filters. After multiple bounces in a zig-zag fashion, multiple channels are separated. The device can also be used as a multiplexer (Mux) with a common port to output a multiplexed light beam including all wavelengths added from the individual channels. This design has a number of advantages including low back-reflection, low loss and high reliability.

In FIG. 1, not all regime of the filter can be used for the Demux. The effective optical path is described in FIG. 3. When a light beam enters the filter 300, the direction of light propagation is shown as dotted line in FIG. 3. The maximum beam diameter that can transmit through as configured in FIG. 1 is $R_{eff}$, which is determined by the refraction index of the medium and the filter. From the perspective view of the cross section of the filter, the regimes top above the top dotted line and beneath the bottom dotted line in the filter as shown in FIG. 3 are not effectively used for optical Mux/Demux application. As the evolution of high speed optical telecommunication and data communication, the dimension of optical transceiver decreases dramatically. To meet this requirement, the size of filters and pitches between two adjacent channels in WDM is reduced. As the pitch deceases, one problem emerges: how to align the filters in a ways that they would not contact each other.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention is related to WDM Mux/DeMux optical devices employing optical filters. Different from the prior art devices that commonly use filters shaped in cuboid, the filters in the embodiment of the present invention are shaped in parallelepiped. In other words, a cross section of such filter is not in parallelogram. According to one embodiment of the present invention, a filter is so cut that a cross section thereof presents a cutting angle not being 90 degrees. As a result, the whole space in the filter is fully used as effective optical path in WDM Mux/DeMux optical devices. Such filters are advantageously used in compact optical modules in terms of dimensions and insertion loss performance.

The present invention may be implemented as an optical device, a method for configuring such an optical device, and a part of an optical system. According to one embodiment, the present invention is an optical device that comprises: an array of reflecting parts; and an array of filters, each of the filters configured to allow a light beam at a selected wavelength to pass through, being a parallelepiped in shape, fully used to transmit a light beam at a selected wavelength, wherein each of the reflecting parts is positioned to correspond to one of the filters and redirects a light beam reflected from one of the filters to another one of the filters.

According to another embodiment, the present invention is an optical device that comprises: for configuring an optical device, the method comprising: providing an array of reflecting parts; and providing an array of filters, wherein each of the filters is configured to allow a light beam at a selected wavelength to pass through, the each of the filters is a parallelepiped in shape and fully used to transmit a light beam at a selected wavelength, wherein each of the reflecting parts is positioned to correspond to one of the filters and redirects a light beam reflected from one of the filters to another one of the filters.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 7 shows a table as a summary of WDM assembly design.

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2-6. However, those skilled in the art will readily appreciate that the detailed description given herein with respect to these figures is for explanatory purposes as the invention extends beyond these limited embodiments.

Figure 1:
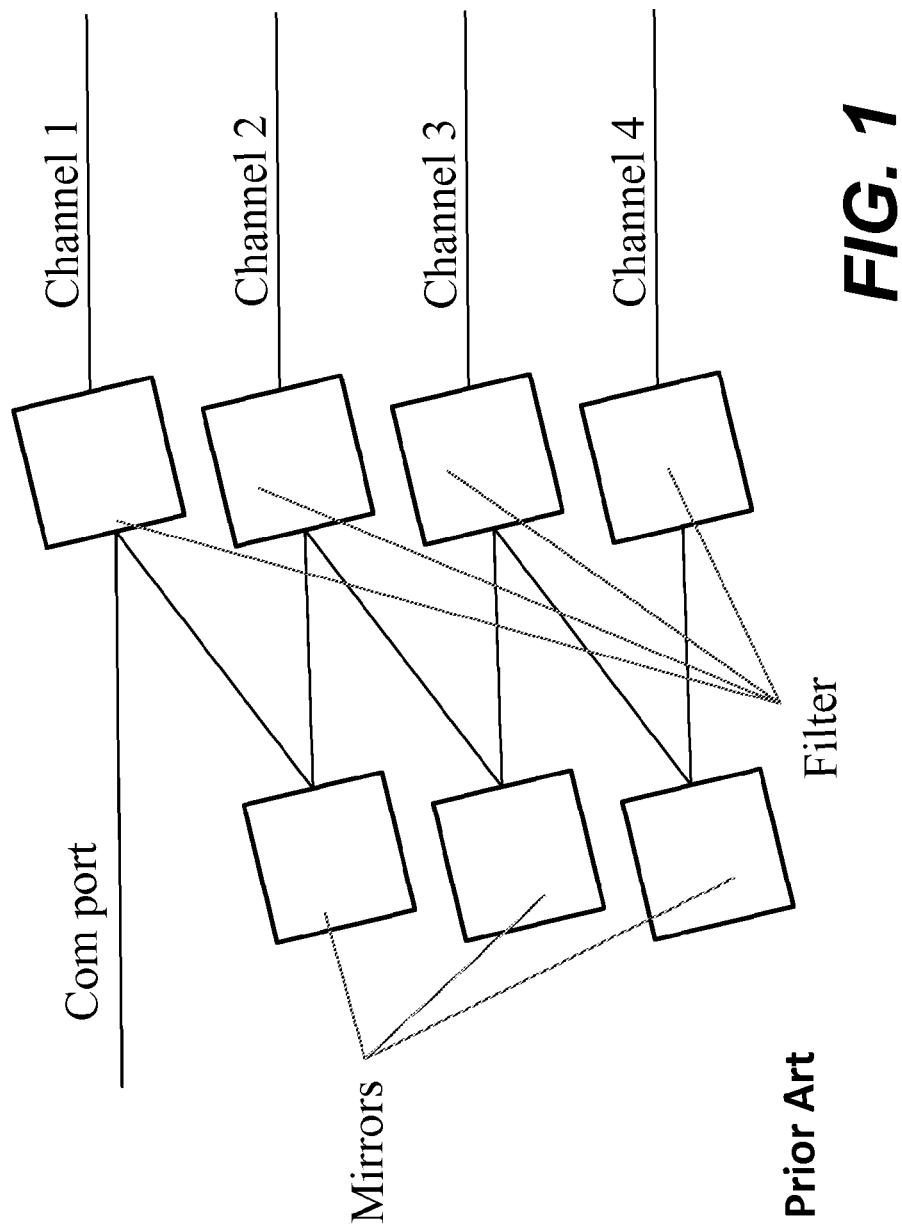
FIG. 1 shows a typical fiber optical transceiver architecture.
Figure 2:
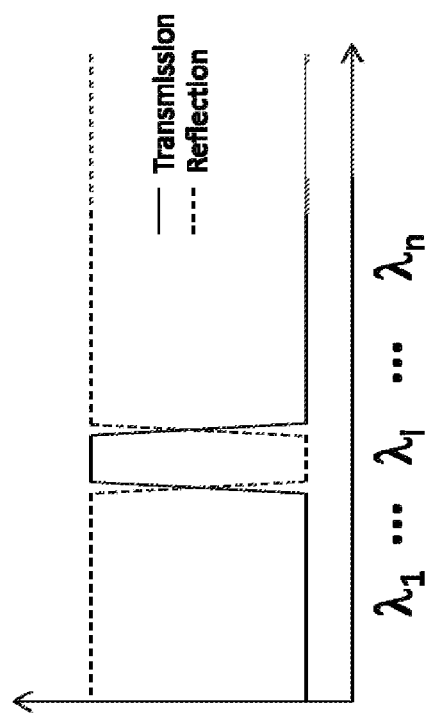
FIG. 2 shows a typical optical transmission and reflection spectra of a single-channel band-pass filter that transmits a wavelength $\lambda_i$ and reflects wavelength from $\lambda_1$ to $\lambda_{i-1}$ and $\lambda_{i+1}$ to $\lambda_n$.
Figure 3:
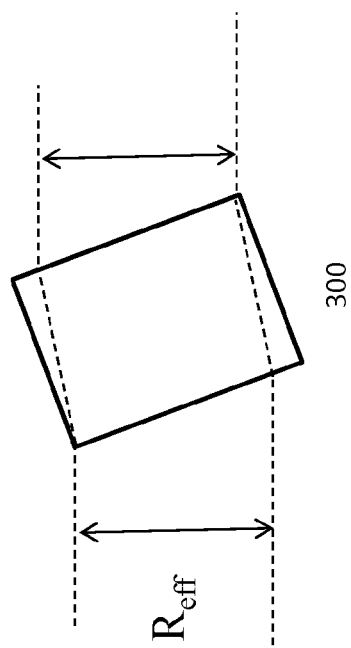
FIG. 3 illustrates an effective optical path in a filter configured in an prior art device.
Figure 4:
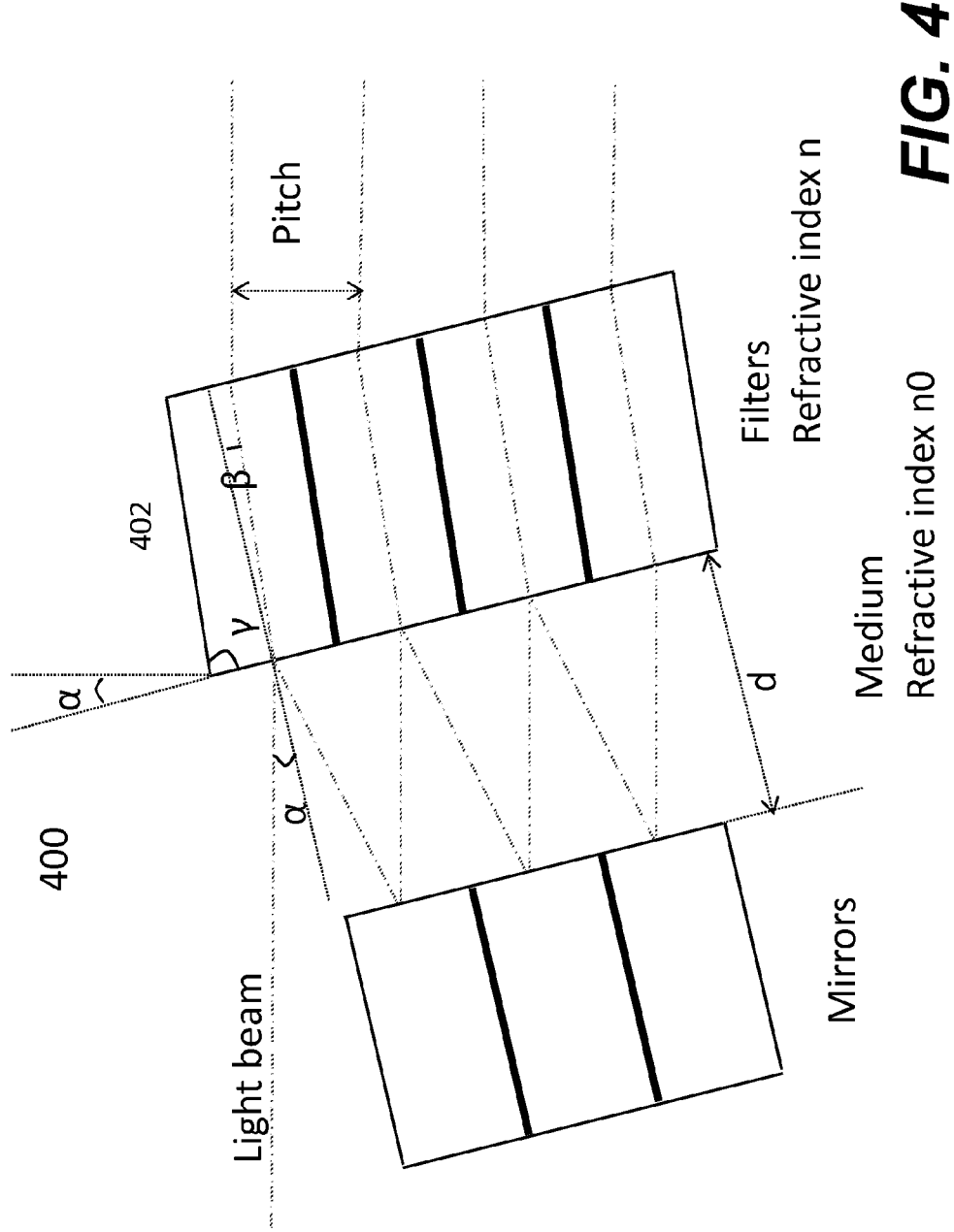
FIG. 4 shows a WDM assembly design using filters with an cutting angle β.
Figure 5:
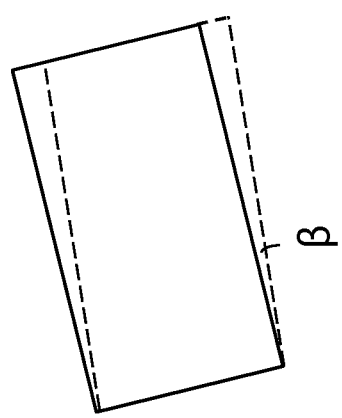
FIG. 5 shows a cross section comparison of a single filter cut with or without a cutting angle β, where the solid one is a convention filter with 90° side-wall angle and the dotted is the one cut with an cutting angle.

Referring now to the drawings, in which like numerals refer to like parts throughout the several views, FIG. 4 shows a WDM assembly design 400 using filters 402 cut with an angle β. Instead of having a filter cut in rectangular or square in a cross section as commonly seen a WDM assembly, hence a cuboid filter, each of the filters 402 has an angle between two sides in cross section. In geometry, each of the filters 402 may be viewed as a parallelepiped which is a three-dimensional figure formed by six parallelograms (the term rhomboid is also sometimes used with this meaning). By analogy, it relates to a parallelogram just as a cube relates to a square or as a cuboid to a rectangle. A parallelogram is well known and has no right angles and equal or unequal sides. In other words, a cross section of a filter in the filters 402 is a parallelogram. FIG. 5 shows a cross section comparison of a single filter cut with or without a cutting angle β. The solid one is the convention filter with 90° side-wall angle and the dotted is the one cut with angle α.

When the assembly design 400 is used in WDM, the device readily combines four light beams of different wavelengths into one single beam or splits one single beam into four different wavelengths. If an array of PDs (photo diodes) or LDs (laser diodes) are placed for the four channels, it can function as TOSA (transmission optical subassembly) or ROSA (reception optical subassembly). According to one embodiment, the whole assembly is in medium of refractive index n0 on a substrate. It is composed with three mirrors and four filters with refractive index n. The light beam has an incident angle α respective to the surface of filters. The distance between the filters and mirrors is d as shown in FIG. 4.

In operation, when a laser beam is impinged upon a first filter at an incident angle α, the angle of the laser beam β in the filter satisfies Fresnel's law which gives (the laser beams goes from air into filter) the following formula:

$$n_0 * \sin \alpha = n * \sin \beta \quad (1)$$

Solving equation (1) gives:

$$\beta = \sin^{-1}\left(\frac{n0 * \sin\alpha}{n}\right) \quad (2)$$

To fully utilize the space, the filter is cut with a degree. The filter corner angle of γ must satisfy:

$$\gamma = 90° - \beta \quad (3)$$

If it is defined that the filter cutting angle Θ=90°−γ, combining equation (2) and equation (3) leads to the following:

$$\theta = \sin^{-1}\left(\frac{n0 * \sin\alpha}{n}\right) \quad (4)$$

From the geometry of the filters, the pitch between two channels is calculated $$\text{pitch} = 2d * \tan\alpha \quad (5)$$

Figure 6:
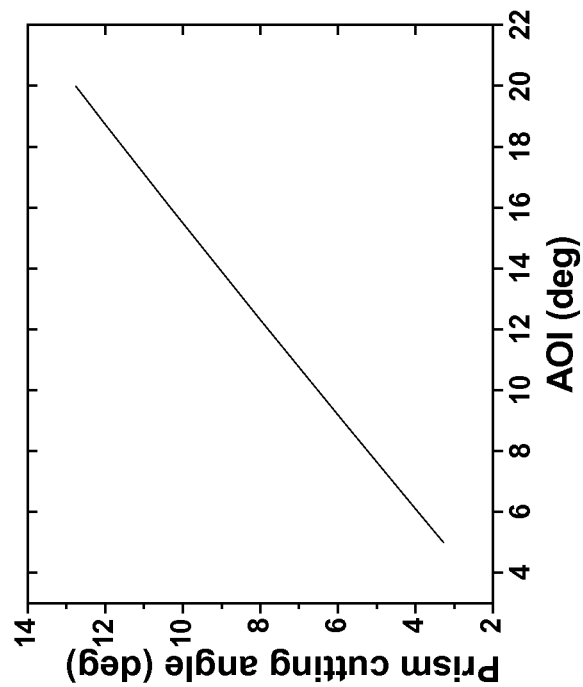
FIG. 6 shows a curve of filter cutting angle vs. AOI in air free space (n0=1) POSA with current filters (n=1.523)

FIG. 6 shows a curve of filter cutting angle vs. AOI in air free space (n0=1) POSA with current filters (n=1.523). There are several particular features in various embodiment that are summarized in the following sections.

For Applications requiring to support 500 um pitch
pitch=500 μm, α=13.5°, n0=1, n=1.523

Cutting angle Θ=Sin$^{-1}$(Sin 13.5°/1.523)=8.8°

For pitch=500 μm, d=500 μm/(2 tan 13.5°=1041 μm which is about 1 mm.

The same as 1. above but with α=12°
pitch=500 μm, n0=1, n=1.523

Cutting angle Θ=Sin$^{-1}$(Sin 12°/1.523)=7.8° d=500 um/(2 tan 12°=1176 μm.

The same as 1. above but using smaller pitch such as 350 um pitch
α=13.5°, n0=1, n=1.523

Cutting angle Θ=Sin$^{-1}$(Sin 13.5°/1.523)=8.8° d=350 μm/(2 tan 13.5°=729 μm.

The Same as 1. above but using high index filter substrate with n=1.7
pitch=500 μm, α=13.5°, n0=1

Cutting angle Θ=Sin$^{-1}$(Sin 13.5°/1.7)=7.9° d=500 μm/(2 tan 13.5°=1041 μm.

The Same as 1. above but using lower index in surrounding environment such as n0=1.1
pitch=500 μm, α=13.5°, n=1.523

Cutting angle Θ=Sin⁻¹(1.1*Sin 13.5°/1.523)=9.7° d=500 μm/(2 tan 13.5°=1041 μm.

The Same as 5. above but the surrounding index matches to the filer glass or n0=n
pitch=500 μm, α=13.5°, n=n0=1.523

Cutting angle Θ=Sin⁻¹(1.523*Sin 13.5°/1.523)=13.5° d=500 μm/(2 tan 13.5°=1041 μm.

For a general application with a set of parameters such as filter angle α, filter refractive index n, distance between filter and mirror is d:
Filter cutting angle Θ=Sin⁻¹(n0*Sin α/n)
The pitch=2d*tan α.

FIG. 7 shows a table as a summary of WDM assembly design. In conclusion, this invention discloses a design of filter used in a Mux/DeMux assembly. With a typical 9° side-wall cutting angle, this filter makes most use of the filters and caters to the requirement of size reduction. One of the objects, advantages and benefits of the present invention is to provide a solution to the placement of filters in narrow pitch design assembly. It has been widely used in transceiver WDM assembly, and continues to dominate in the optical CFP4, QSFP-28 or other form-factors to emerge that require free-space thin-film filter based Mux/Demux designs. Last but not the least, the aforementioned invention also support applications other than 4-ch compact transceiver designs.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What we claim is:

1. An optical device comprising:
an array of reflecting parts;
an array of filters, each of the filters configured to allow a light beam at a selected wavelength to pass through, being a parallelepiped in shape, fully used to transmit a light beam at a selected wavelength, wherein each of the reflecting parts is positioned to correspond to one of the filters and redirects a light beam reflected from one of the filters to another one of the filters, a cross section of the each of the filters presents a cutting angle between two sides not being 90 degrees at one of four corners of the cross section, the cutting angle being β satisfies Fresnel's law which gives:

$$\beta = \text{Sin}^{-1}\left(\frac{n0 * \text{Sin}\alpha}{n}\right)$$

or $$n_0 * \text{Sin}\alpha = n * \text{Sin}\beta,$$

wherein the reflecting parts and the filters are in a medium of refractive index n0 on a substrate and have a refractive index n, the light beam is impinged upon one of the filters at an incident angle α, a distance between the filters and mirrors is d.

2. The optical device as recited in claim 1, wherein the cross section of the each of the filters is a parallelogram.

3. A method for configuring an optical device, the method comprising:
providing an array of reflecting parts;
providing an array of filters, wherein each of the filters is configured to allow a light beam at a selected wavelength to pass through, the each of the filters is a parallelepiped in shape and fully used to transmit a light beam at a selected wavelength, wherein each of the reflecting parts is positioned to correspond to one of the filters and redirects a light beam reflected from one of the filters to another one of the filters, a cross section of the each of the filters presents a cutting angle not being 90 degrees at one of four corners of the cross section, the reflecting parts and the filters are in a medium of refractive index n0 on a substrate and have a refractive index n, the light beam is impinged upon one of the filters at an incident angle α, a distance between the filters and mirrors is d, the cutting angle of the laser beam being β in the filter satisfies Fresnel's law which gives $$n_0 * \text{Sin}\alpha = n * \text{Sin}\beta$$

or $$\beta = \text{Sin}^{-1}\left(\frac{n0 * \text{Sin}\alpha}{n}\right).$$

* * * * *